(12) United States Patent
Nam

(10) Patent No.: US 9,033,396 B2
(45) Date of Patent: May 19, 2015

(54) DOOR OPENING PREVENTING APPARATUS FOR A VEHICLE

(71) Applicant: Hyundai Motor Company, Seoul (KR)

(72) Inventor: Jin Woo Nam, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 13/952,251

(22) Filed: Jul. 26, 2013

(65) Prior Publication Data

US 2014/0306486 A1  Oct. 16, 2014

(30) Foreign Application Priority Data

Apr. 10, 2013 (KR) .................. 10-2013-0038910

(51) Int. Cl.
*E05B 77/06* (2014.01)
*B60J 5/04* (2006.01)

(52) U.S. Cl.
CPC ............. *E05B 77/06* (2013.01); *B60J 5/0456* (2013.01); *Y10S 292/22* (2013.01); *Y10S 292/27* (2013.01)

(58) Field of Classification Search
CPC .......... B60J 5/04; B60J 5/0416; B60J 5/0433; B60J 5/0456; B62D 21/157; E05B 77/06
USPC ................... 296/146.1, 146.6, 146.9, 187.12; 292/336.3, DIG. 3, DIG. 22, DIG. 27, 292/DIG. 65; 49/460, 503
See application file for complete search history.

(56) References Cited

U.S. PATENT DOCUMENTS

| | | | |
|---|---|---|---|
| 3,583,741 A * | 6/1971 | Breitschwerdt et al. ...... | 292/216 |
| 3,719,248 A * | 3/1973 | Breitschwerdt et al. ...... | 180/271 |
| 5,669,642 A * | 9/1997 | Kang ......................... | 292/336.3 |
| 7,232,164 B2 * | 6/2007 | Lee ............................ | 292/336.3 |
| 8,322,077 B2 * | 12/2012 | Papanikolaou et al. ........ | 49/460 |
| 2003/0001399 A1 * | 1/2003 | Sato ........................... | 292/336.3 |
| 2014/0084603 A1 * | 3/2014 | Bejune et al. ................ | 292/198 |

FOREIGN PATENT DOCUMENTS

| | | |
|---|---|---|
| DE | 19511651 A1 * | 10/1995 |
| EP | 1050644 A2 * | 11/2000 |
| KR | 10-2006-0062052 A | 6/2006 |
| KR | 10-0737001 B1 | 7/2007 |
| KR | 10-0783544 B1 | 12/2007 |
| KR | 10-0887852 B1 | 3/2009 |
| KR | 10-0892508 B1 | 4/2009 |

* cited by examiner

*Primary Examiner* — Glenn Dayoan
*Assistant Examiner* — Jason S Daniels
(74) *Attorney, Agent, or Firm* — McDermott Will & Emery LLP

(57) ABSTRACT

A door opening preventing apparatus for a vehicle includes an outer door handle mounted on an outer surface of a door panel, a door opening lever mounted on an interior of the door panel to angularly rotate and interlocking with the outer door handle when the outer door handle is opened, and a latch cable connected to the door opening lever, wherein a separate balance weight is disposed at an upper end of the door opening lever to contact the door opening lever, and the door opening lever is pushed by the balance weight outward due to a forward inertial force during a side collision of a vehicle, and only the balance weight is angularly rotated inward by a reverse inertial force.

4 Claims, 6 Drawing Sheets

- State before opening a door -

- Opening operation a door -

- State before opening a door -

- Door opening operation -

DOOR OPENING PREVENTING APPARATUS FOR A VEHICLE

CROSS-REFERENCE TO RELATED APPLICATION

This application is based on and claims the benefit of priority to Korean Patent Application No. 10-2013-0038910, filed on Apr. 10, 2013, the entire contents of which are incorporated herein by reference.

TECHNICAL FIELD

The present disclosure relates to a door opening preventing apparatus for a vehicle, and more particularly, to a door opening preventing apparatus for a vehicle to prevent a door opening lever interlocking with an outer door handle from moving when a reverse inertial force is applied during a side collision of a vehicle, thereby preventing a door from being opened.

BACKGROUND

In general, an outer door handle of a vehicle for opening a door from the outside is mounted on an outer side of a door panel, and a door opening lever which is interlocked with the outer door handle when the outer door handle is opened, is mounted on an inner side of the door panel, and the door opening lever. A door latch assembly for locking and unlocking the door are connected to each other by a latch cable.

Referring to FIGS. 1 and 2, which illustrate a configuration for opening a door according to the related art, a balance weight 14 is integrally formed with an upper end of a door opening lever 12 connected to an outer door handle 10, and a rotary shaft 18 and a return spring 16 are inserted in an inner end of a middle portion of the door opening lever 12. A latch cable connecting end 20 protrudes from an outer end of the middle portion of the door opening lever 12. Accordingly, a latch cable 22 connected to a door latch assembly (not shown) for locking and unlocking a door is connected to the latch cable connecting end 20.

A stopper 24 for restricting a position of the door opening lever 12 before an operation thereof is disposed adjacent to a lower end of the door opening lever 12

If the outer door handle 10 is pulled to open the door as illustrated in FIG. 2, the door opening lever 12 angularly rotates about the rotary shaft 18, and a lower end of the door opening lever 12 angularly rotates in an outward direction, moving away from the stopper 24, as the balance weight 14 angularly rotates in an inward direction. Further, the latch cable connecting end 20 rotates toward an upper direction.

Thus, the door is opened by performing a usual unlocking operation of the door latch assembly as the latch cable 22 is pulled up.

As shown in FIG. 3, the vehicle receives a primary forward inertial force, and immediately receives a secondary reverse inertial force by an internal repulsive force during a side collision of the vehicle.

Since the outer door handle 10 may be pulled out as described in FIG. 3 by the primary forward inertial force during a side collision of the vehicle causing the door to be opened. By integrally mounting the balance weight 14 to the door opening lever 12 as described above.

Immediately after the side collision of the vehicle, the outer door handle 10 receives a force heading for an outer side of the vehicle by the forward inertial force to be pulled, but since the balance weight 14 integrally formed with the door opening lever 12 receives the forward inertial force and leans to the outer side of the vehicle, the door opening lever 12 is not angularly rotated in an opening direction, and eventually the door is not opened even if the outer door handle is pulled by the forward inertial force.

Opening of the door by the forward inertial force can be prevented by integrally mounting the balance weight to the door opening lever, but the door may still be opened since the balance weight is angularly rotated in an inward direction of the vehicle by the secondary reverse inertial force.

When an internal reaction of the vehicle immediately after the side collision of the vehicle generates the secondary reverse inertial force, the balance weight 14 integrally formed with the door opening lever 12 and the door opening lever 12 angularly rotates toward the inward direction of the vehicle by the reverse inertial force. At the same time, since the latch cable 22 connected to the latch cable connecting end 20 of the door opening lever 12 is pulled, the door latch assembly is unlocked and opens the door which may cause a secondary damage due to opening of the door.

SUMMARY OF THE DISCLOSURE

The present disclosure provides a door opening preventing apparatus for a vehicle in which a separate balance weight is disposed at an upper end of a door opening lever interlocked with an outer door handle to contact the door opening lever so that only the balance weight can be angularly rotated in a reverse inertial direction by a reverse inertial force during a side collision of the vehicle to prevent the door opening lever from being moved by the reverse inertia and also prevent the door from being opened.

In accordance with the present disclosure, there provides a door opening preventing apparatus for a vehicle, including: an outer door handle mounted on an outer surface of a door panel; a door opening lever mounted on an interior of the door panel to be angularly rotated and interlocked with the outer door handle when the outer door handle is opened; and a latch cable connected to the door opening lever, wherein a separate balance weight is disposed at an upper end of the door opening lever to contact the door opening lever, and the door opening lever is pushed by the balance weight outward due to a forward inertial force during a side collision of a vehicle, and only the balance weight is angularly rotated inward by a reverse inertial force.

In accordance with an embodiment of the present disclosure, an upper end of the balance weight has a small diameter portion mounted to an inner frame of a door panel to be rotated by a rotary shaft, and a lower end of the balance weight has a large diameter portion contacting an inner surface of the upper end of the door opening lever.

In accordance with another embodiment of the present disclosure, a weight having a predetermined weight is mounted integrally with the large diameter portion of the balance weight.

In accordance with still another embodiment of the present disclosure, a return spring to provide a resilient restoring force pushing the balance weight outward is mounted on the rotary shaft of the balance weight.

In accordance with yet another embodiment of the present disclosure, the upper end of the door opening lever has a contact end having a curved shape to contact the large diameter portion of the balance weight.

Accordingly, the present disclosure has following effects.

Since a separate angularly rotated balance weight is disposed at an upper end of the door opening lever interlocked with the outer door handle to contact the door opening door, the balance weight pushes a door opening lever outward even if an outer door handle is pulled by a forward inertial force during a side collision of a vehicle, to prevent a door from being opened by the forward inertial force during the side collision of the vehicle.

In particular, since only the balance weight separated from the door opening lever is angularly rotated toward an inward direction of the vehicle and the door opening lever is not moved but located in place if a reverse inertial force is applied immediately after the forward inertial force is applied, the door opening lever is not moved at all even by the reverse inertial force, making it possible to easily prevent the door from being opened and also prevent a secondary damage caused when opening of the door.

BRIEF DESCRIPTION OF THE DRAWINGS

The above and other features of the present disclosure will now be described in detail with reference to certain exemplary embodiments thereof illustrated the accompanying drawings which are given hereinafter by way of illustration only, and thus are not limitative of the present disclosure, and wherein.

Figure 1:
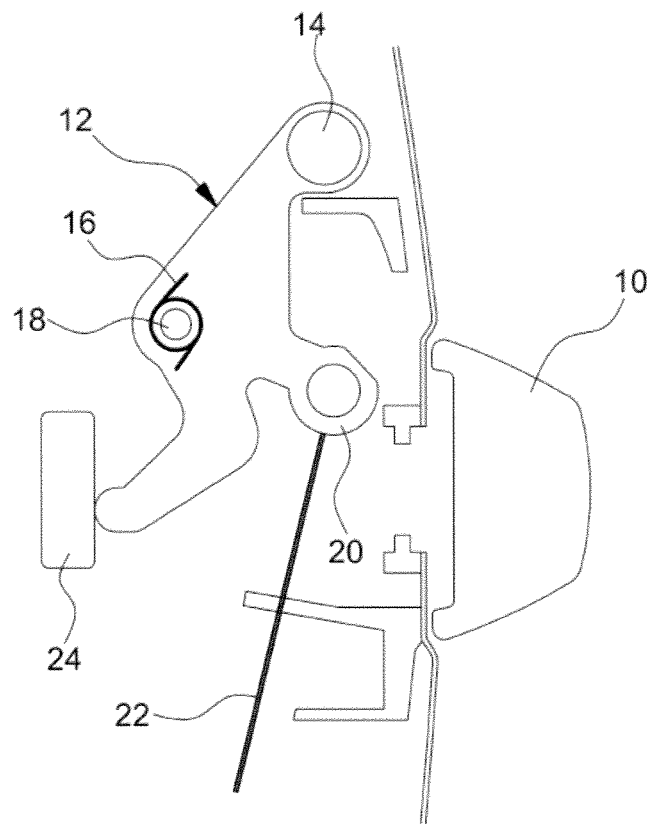
FIGS. 1, 2 and 3 are sectional views showing a configuration for opening a door of a vehicle according to the related art.
Figure 2:
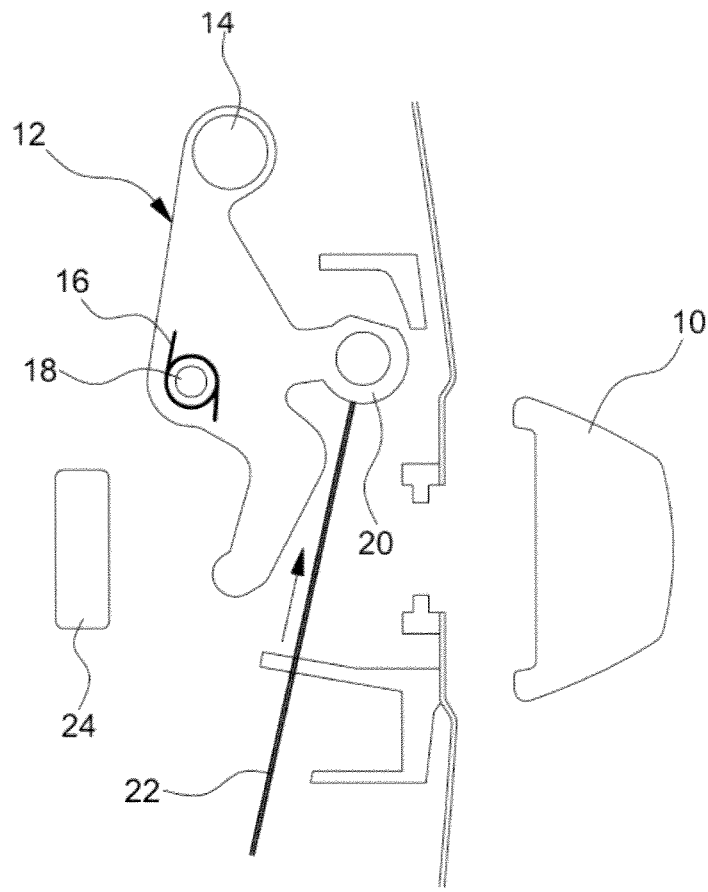
Figure 3:
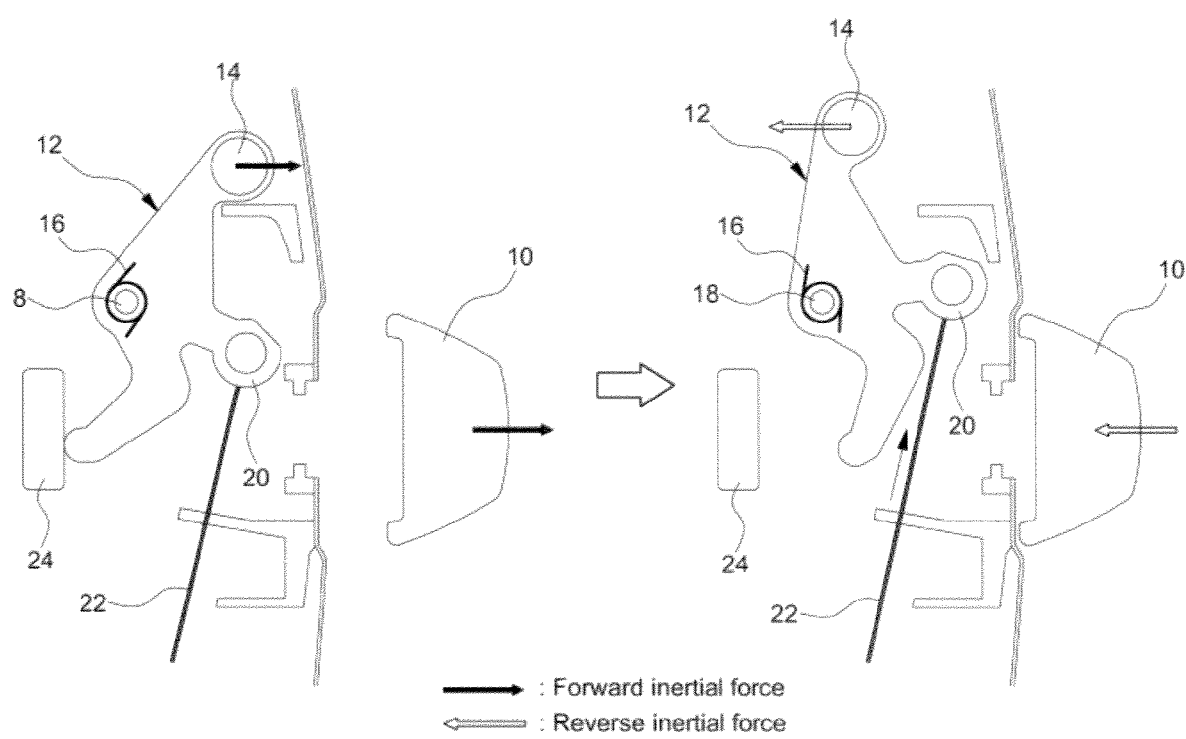

The appended drawings are not necessarily to be scaled, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings.

Figure 4:
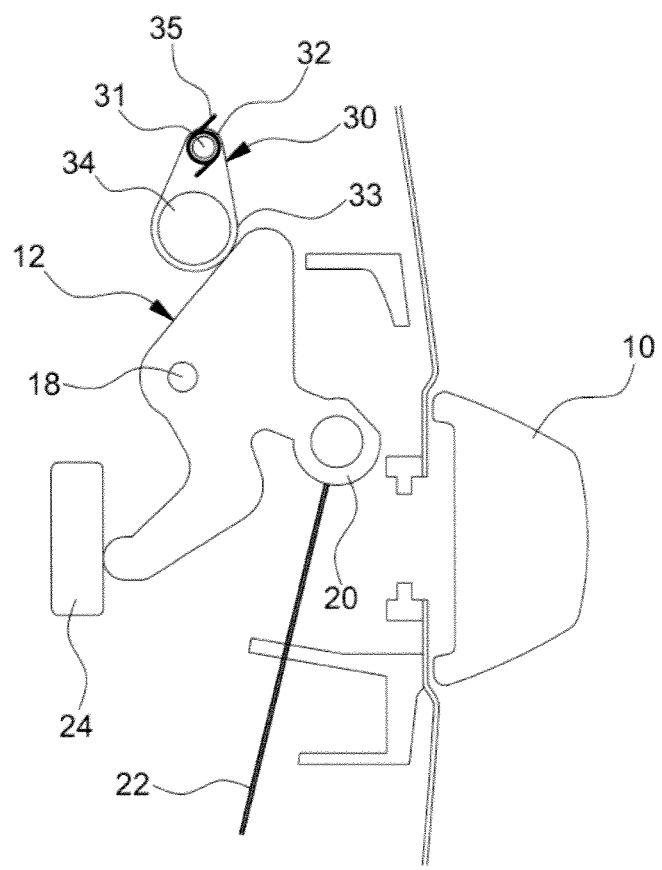
FIGS. 4, 5 and 6 are sectional views showing a door opening preventing apparatus for a vehicle according to the present disclosure.
Figure 5:
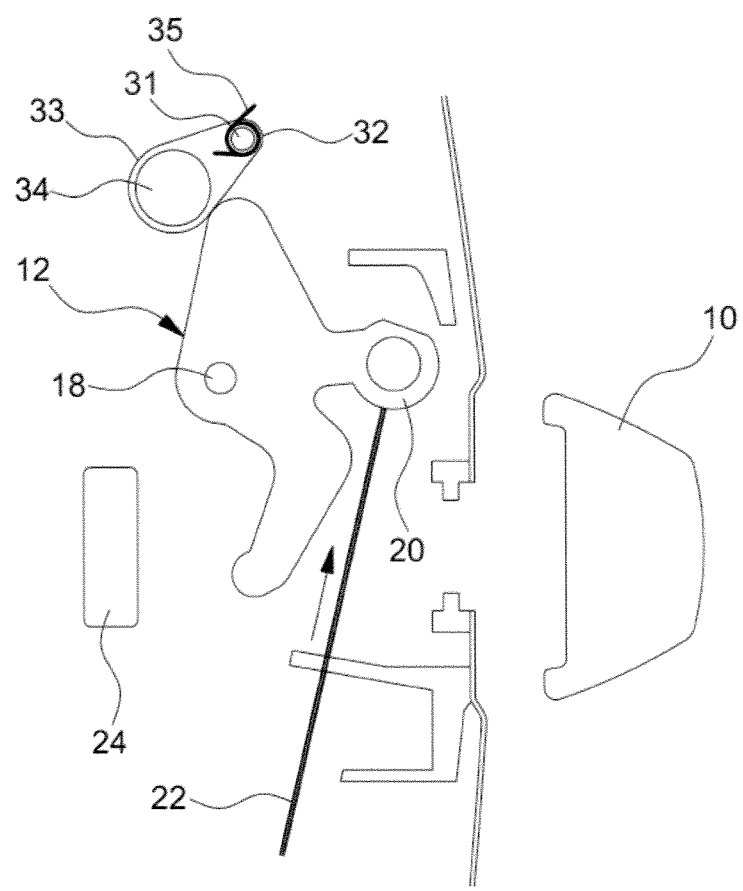

FIGS. 4 and 5 show a door opening preventing apparatus for a vehicle according to the present disclosure. FIG. 4 shows a state before opening a door in a normal condition, and FIG. 5 shows a state where the door is opened in the normal condition.

An outer door handle 10 is mounted on an outer side of a door panel, and a door opening lever 12 interlocked with the outer door handle 10 when the outer door handle 10 is opened is mounted at the inner side of the door panel to be angularly rotated. The door opening lever 12 and a door latch assembly (not shown) for locking and unlocking the door are connected to each other by a latch cable 22.

According to the present disclosure, a separate independent balance weight 30 is disposed at an upper end of the door opening lever 12 connected to the outer door handle 10 to be angularly rotated.

Then, a contact end 13 contacting the balance weight 30 is formed at an upper end of the door opening lever 12, and a rotary shaft 18 is disposed in an inner end of a middle portion of the door opening lever 12. Further, a latch cable connecting end 20 protrude from an outer end of the middle portion of the door opening lever 12, and a latch cable 22 connected to a door latch assembly for locking and unlocking the door is connected to the latch cable connecting end 20.

Further, a stopper 24 restricting a position of the door opening lever 12 before an opening operation thereof is disposed at a location adjacent to a lower end of the door opening lever 12.

A balance weight 30 according to the present disclosure is disposed to independently contact the upper end of the door opening lever 12.

In more detail, an upper end of the balance weight 30 has a small diameter portion 32 rotatably mounted on an inner frame (not shown) of a door panel by a rotary shaft 31, and an lower end of the balance weight 30 has a large diameter portion 33 contacting an inner surface of the upper end of the door opening lever 12, and a weight 34 having a predetermined weight is integrally mounted to the large diameter portion 33 along an axial direction of the rotary shaft 31 of the balance weight 30.

Then, a return spring 35 is mounted to the rotary shaft 31 of the balance weight 30 to provide a resilient restoring force for continuously pushing the balance weight 30 outward.

Meanwhile, the door opening lever 12 and the balance weight 30 should smoothly contact each other when the door opening lever 12 pushes the balance weight 30 or the balance weight 30 pushes the door opening lever 12. Accordingly, the upper end of the door opening lever 12 has a contact end 13 having a curved shape to smoothly contact a surface of the large diameter portion 33 of the balance weight 30.

Thus, if the balance weight 30 receives a forward inertial force during a side collision of the vehicle, the balance weight 30 pushes the door opening lever 12 outward. Further, if the balance weight 30 receives a reverse inertial force, the balance weight 30 is angularly rotated toward an inward direction of a vehicle alone to be spaced apart from the door opening lever 12.

Here, an operation flow of the above-configured door opening preventing apparatus for a vehicle according to the present disclosure will be described below.

If the outer door handle 10 is pulled out to open the door in a normal situation without any collision of the vehicle, the door opening lever 12 is angularly rotated about the rotary shaft 18, and a lower end of the door opening lever 12 is angularly rotated outward as the contact end 13 of the door opening lever 12 is angularly rotated inward, and the latch cable connecting end 20 is angularly rotated upward.

As shown in FIG. 5, when the balance weight 30 is pushed while the contact end 13 of the door opening lever 12 is angularly rotated inward, the balance weight 30 is angularly rotated inward as well, and the door is opened as a general unlocking operation of the door latch assembly when the latch cable 22 connected to the latch cable connecting end 20 is pulled up.

As the outer door handle 10 is released, the balance weight 30 pushes the door opening lever 12 as the balance weight 30 angularly rotates in an outward direction of the vehicle by a resilient restoring force of the return spring 35 attached to the rotary shaft 31 of the balance weight 30, and the door opening lever 12 eventually returns to an original position.

Figure 6:
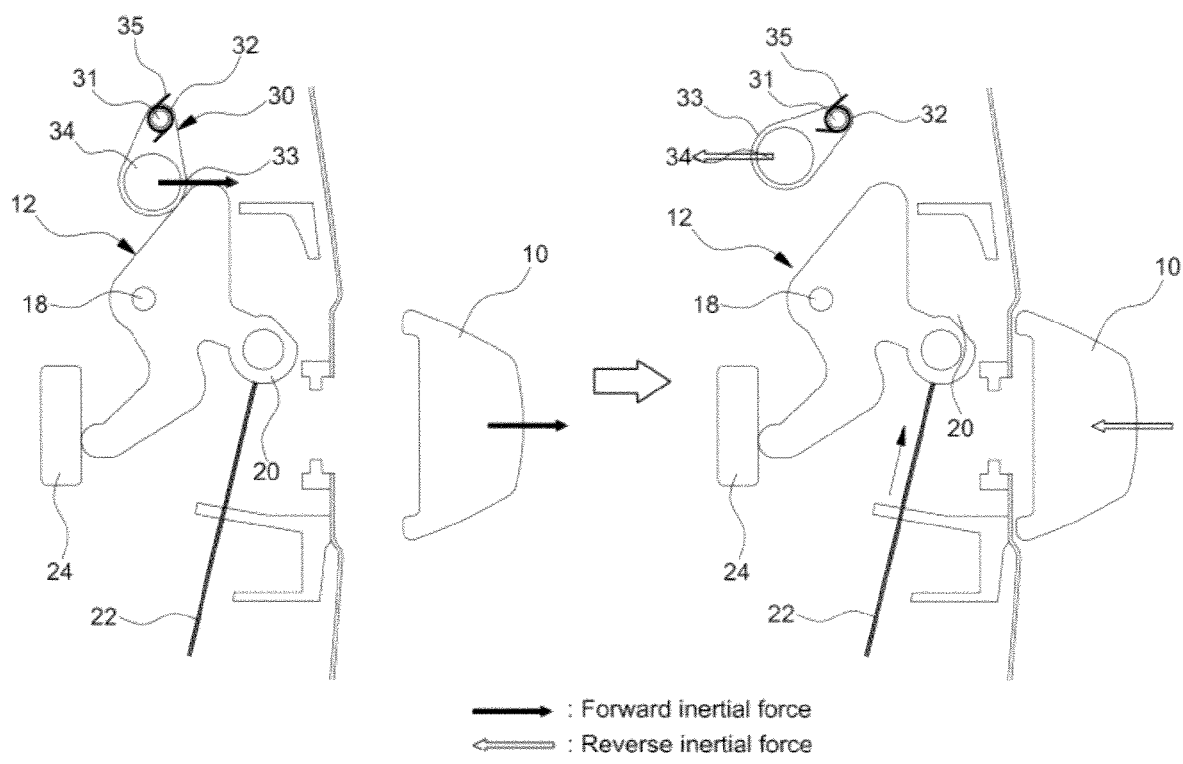

As shown in FIG. 6, when the outer door handle 10 receives a force heading for an outer side of the vehicle due to a forward inertial force during the side collision of the vehicle to be pulled, the balance weight 30 receives the forward inertial force to lean to the outside, and serves to interrupt the door opening lever 12 from being angularly rotated toward an opening direction. Accordingly, the door is not opened even if the outer door handle is pulled by the forward inertial force.

Especially, if a secondary reverse inertial force is instantaneously generated by a repulsive force in an interior of the vehicle immediately after the side collision of the vehicle, the pulled outer door handle 10 returns to the original position, and only the balance weight 30 is angularly rotated in an inward direction of a vehicle to be spaced apart from the door opening lever 12.

In more detail, the large diameter portion 33 and the weight 34 are angularly rotated about the rotary shaft 31 of the balance weight 30 in the inward direction of the vehicle by the reverse inertial force, and thus the large diameter portion 33 of the balance weight 30 is spaced apart from the contact end 13 of the door opening lever 12.

Then, since the outer door handle 10 returns to the original position, the door opening lever 12 remains fixed without any angular rotations, and the latch cable 22 connected to the door open handle 12 is not pulled.

Thus, since the door latch assembly is not unlocked as the latch cable 22 is not pulled, the door is prevented from being operated by the reverse inertial force during the side collision of the vehicle.

Opening the door by the forward inertial force during a side collision of the vehicle can be prevented by the balance weight 30 as described above. Further, since only the balance weight 30 is angularly rotated in the inward direction of the vehicle but the door opening lever 12 is not moved but is positioned in place even if the reverse inertial force is applied, the door opening lever is not moved at all even by the reverse inertial force and the door can be easily prevented from being opened, and a secondary injury made by opening of the door can be prevented.

What is claimed is:

1. A door opening preventing apparatus for a vehicle, comprising:

an outer door handle mounted on an outer surface of a door panel;

a door opening lever mounted on an interior of the door panel to angularly rotate, and interlocking with the outer door handle when the outer door handle is pulled; and a latch cable connected to the door opening lever, wherein a separate balance weight is disposed at an upper end of the door opening lever to contact the door opening lever, and the door opening lever is pushed by the balance weight outward due to a forward inertial force during a side collision of the vehicle, and only the balance weight is angularly rotated inward by a reverse inertial force, and wherein an upper end of the balance weight has a small diameter portion mounted on an inner frame of a door panel to be rotated by a rotary shaft, and a lower end of the balance weight has a large diameter portion contacting an inner surface of the upper end of the door opening lever.

2. The door opening preventing apparatus of claim 1, wherein a weight having a predetermined weight is mounted integrally with the large diameter portion of the balance weight.

3. The door opening preventing apparatus of claim 1, wherein a return spring for providing a resilient restoring force for pushing the balance weight outward is mounted to the rotary shaft of the balance weight.

4. The door opening preventing apparatus of claim 1, wherein the upper end of the door opening lever has a contact end having a curved shape to contact the large diameter portion of the balance weight.

\* \* \* \* \*